(12) United States Patent
Fan (10) Patent No.: US 11,018,396 B2
(45) Date of Patent: May 25, 2021

(54) BATTERY BOX (71) Applicant: Primax Electronics Ltd., Taipei (TW)

(72) Inventor: Shun-Biao Fan, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 156 days.

(21) Appl. No.: 16/363,234

(22) Filed: Mar. 25, 2019

(65) Prior Publication Data

US 2020/0203680 A1 Jun. 25, 2020

(30) Foreign Application Priority Data

Dec. 21, 2018 (CN) .......................... 201811572668.8

(51) Int. Cl.
*H01M 50/213* (2021.01)
*H01M 50/107* (2021.01)

(52) U.S. Cl.
CPC ....... *H01M 50/213* (2021.01); *H01M 50/107* (2021.01)

(58) Field of Classification Search
None
See application file for complete search history.

*Primary Examiner* — Carmen V Lyles-Irving
(74) *Attorney, Agent, or Firm* — Kirton McConkie; Evan R. Witt (57) ABSTRACT

A battery box includes a box body, a first push element, a second push element and a third push element. The box body includes a first lateral wall, a second lateral wall and a bottom wall, which are arranged beside each other. The first push element has a first opening. The second push element has a second opening. The third push element has a third opening. The first push element is movable through the first opening along a first axis. The second push element is movable through the second opening along a second axis. The third push element is movable through the third opening along a third axis. An accommodation space of the box body is defined by the first push element, the second push element and the third push element according to a usage state of the battery box.

9 Claims, 7 Drawing Sheets

Fig. 12

BATTERY BOX

FIELD OF THE INVENTION

The present invention relates to a battery box, and more particularly to a battery box for an electronic device.

BACKGROUND OF THE INVENTION

Generally, batteries are widely used for providing electric power to most commercially available electronic products (e.g., mobile phones, digital cameras or remote controls). Although the batteries can be purchased very easily, it is still inconvenient for the average consumers. Especially, different types of batteries cannot be shared. For example, the AA battery (i.e., No. 5 battery) and the AAA battery (i.e., No. 7 battery) are widely used in many electronic devices. As known, some kinds of electronic devices may utilize the No. 5 battery and the No. 7 battery. However, since the size of the battery box of the electronic device is determined according to the size of the battery type, the size of the battery box is unchanged and fixed. Moreover, since the size of the battery box is fixed, the purpose of sharing different types of batteries cannot be achieved. If the consumer purchases the wrong type of batteries, the batteries cannot be used. Alternatively, the consumers may prepare some different sizes of batteries in homes for backup. In other words, the uses of the batteries are troublesome. Therefore, there is a need of providing an improved battery box in order to overcome the drawbacks of the conventional technologies.

SUMMARY OF THE INVENTION

An object of the present invention provides a battery box with an accommodation space. The capacity of the accommodation space is adjustable according to the usage state of the battery box.

The other objects and advantages of the present invention will be understood from the disclosed technical features.

In accordance with an aspect of the present invention, there is provided a battery box. The battery box includes a box body, a first push element, a second push element and a third push element. The box body includes a first lateral wall, a second lateral wall and a bottom wall, which are arranged beside each other. The first lateral wall has a first opening. The second lateral wall has a second opening. The bottom wall has a third opening. The first opening, the second opening and the third opening face different directions. The first push element is movably penetrated through the first opening of the first lateral wall. The first push element is moved along a first axis in response to a first external force. The second push element is movably penetrated through the second opening of the second lateral wall. The second push element is moved along a second axis in response to a second external force. The third push element is movably penetrated through the third opening of the bottom wall. The third push element is moved along a third axis in response to a third external force. The first axis, the second axis and the third axis are not in parallel with each other. An accommodation space of the box body is defined by the first push element, the second push element and the third push element according to a usage state of the battery box.

From the above descriptions, the present invention provides the battery box. The push elements of the battery box are movable along three axes in response to the elastic restoring forces of the elastic elements. Consequently, the capacity of the accommodation space in the box body is adjustable according to the usage state of the battery box. In such way, the battery with a suitable size or a suitable number of batteries can be accommodated within the box body. Due to this design, different types of batteries can be placed within the battery box of the present invention. The batteries can be easily placed within the battery box through the two steps of pressing the batteries into the box body of the battery box and covering the covering plate. Similarly, the batteries can be easily removed from the battery box through the two steps of opening the covering plate and taking out the batteries from the box body. The battery box of the present invention has a simplified structure and succinct components. Consequently, the battery box is user-friendly and cost-effective.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
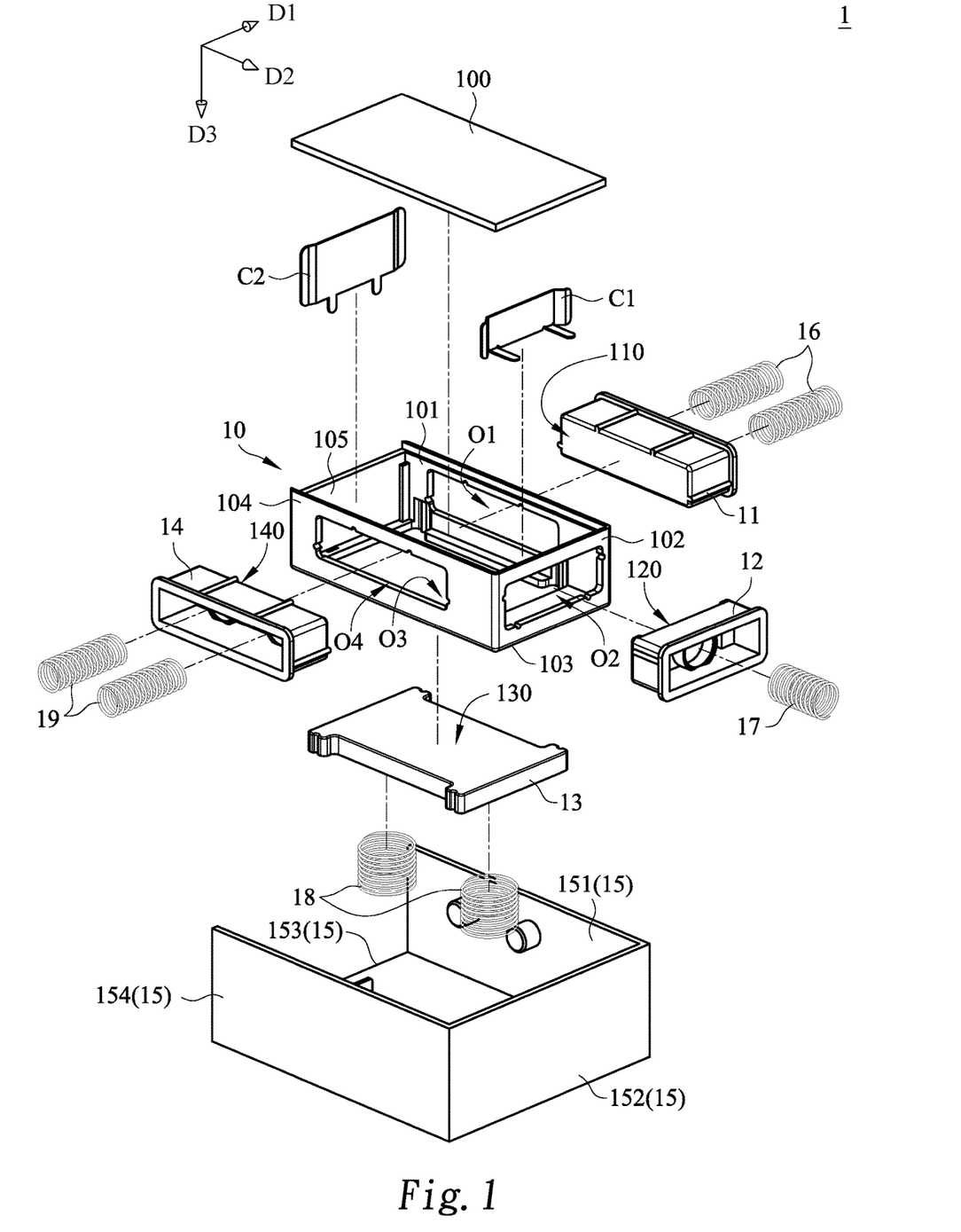
FIG. 1 is a schematic exploded view illustrating a battery box according to an embodiment of the present invention.
Figure 2:
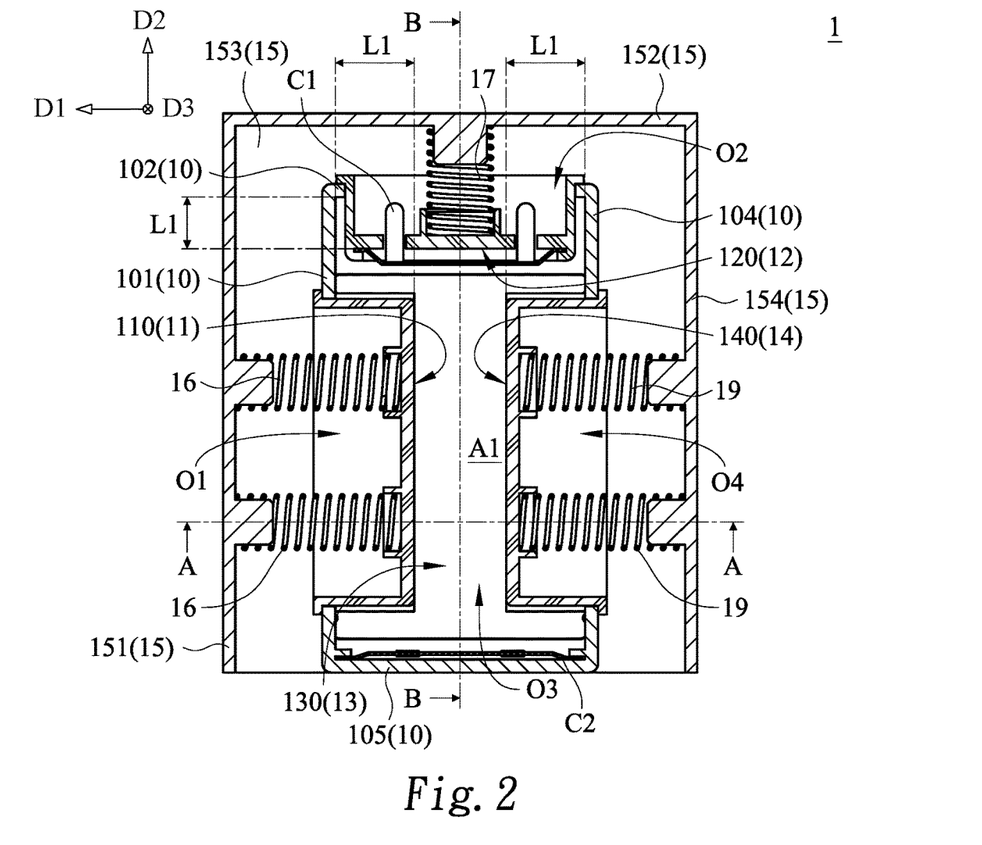
FIG. 2 is a schematic top view of the assembled battery box of FIG. 1.
Figure 3:
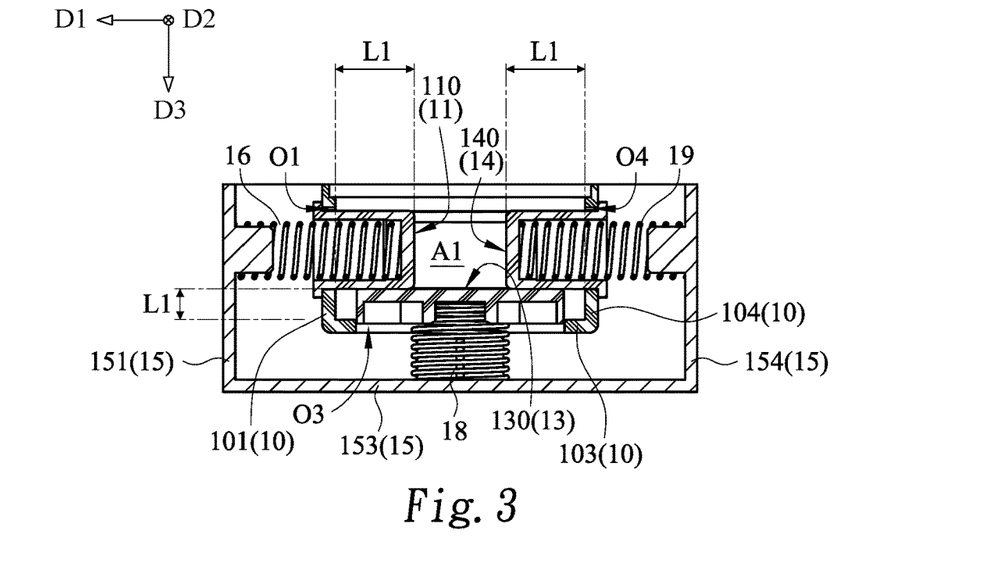
FIG. 3 is a schematic cross-sectional view illustrating the battery box of FIG. 2 and taken along the line AA.
Figure 4:
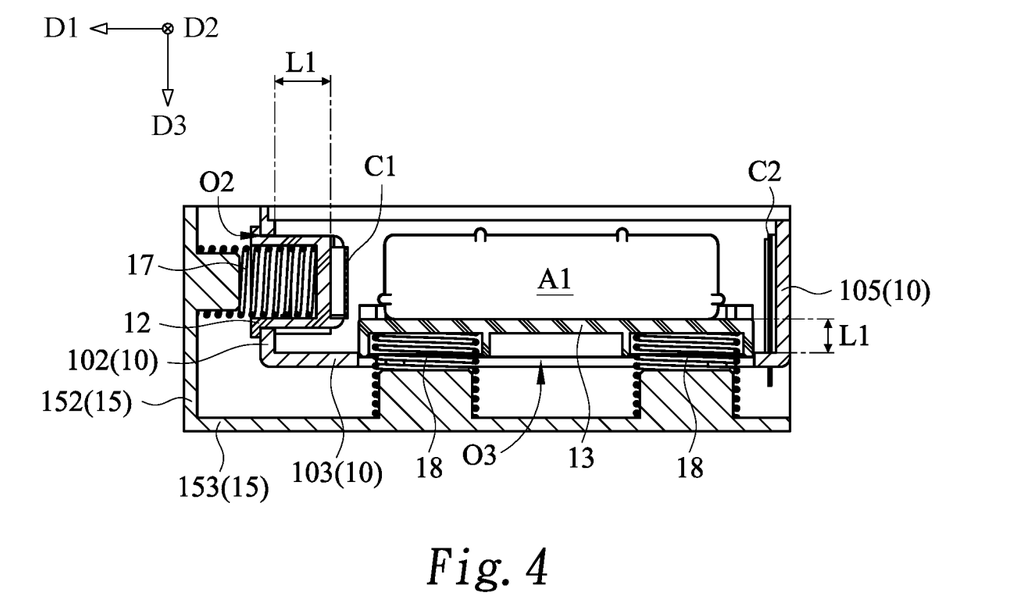
FIG. 4 is a schematic cross-sectional view illustrating the battery box of FIG. 2 and taken along the line BB.

Please refer to FIGS. 1, 2, 3 and 4. FIG. 1 is a schematic exploded view illustrating a battery box according to an embodiment of the present invention. FIG. 2 is a schematic top view of the assembled battery box of FIG. 1. FIG. 3 is a schematic cross-sectional view illustrating the battery box of FIG. 2 and taken along the line AA. FIG. 4 is a schematic cross-sectional view illustrating the battery box of FIG. 2 and taken along the line BB. As shown in FIGS. 1, 2, 3 and 4, the battery box 1 comprises a box body 10, a first push element 11, a second push element 12 and a third push element 13.

The box body 10 comprises a first lateral wall 101, a second lateral wall 102 and a bottom wall 103, which are arranged beside each other. The first lateral wall 101 has a first opening O1. The second lateral wall 102 has a second opening O2. The bottom wall 103 has a third opening O3. The first opening O1, the second opening O2 and the third opening O3 face different directions.

The first push element 11 is movably penetrated through the first opening O1 of the first lateral wall 101. In response to an external force, the first push element 11 is moved along a first axis D1. The second push element 12 is movably penetrated through the second opening O2 of the second lateral wall 102. In response to an external force, the second push element 12 is moved along a second axis D2. The third push element 13 is movably penetrated through the third opening O3 of the bottom wall 103. In response to an external force, the third push element 13 is moved along a third axis D3. The first axis D1, the second axis D2 and the third axis D3 are not in parallel with each other. Preferably but not exclusively, the first axis D1, the second axis D2 and the third axis D3 are perpendicular to each other.

Please refer to FIGS. 1, 2, 3 and 4 again. In this embodiment, the box body 10 further comprises a third lateral wall 104. The third lateral wall 104 is opposed to the first lateral wall 101. The third lateral wall 104, the second lateral wall 102 and the bottom wall 103 are arranged beside each other. The third lateral wall 104 has a fourth opening O4. The fourth opening O4, the second opening O2 and the third opening O3 face different directions. The box body 10 further comprises a fourth push element 14. The fourth push element 14 is movably penetrated through the fourth opening O4 of the third lateral wall 104. In response to an external force, the fourth push element 14 is moved along the first axis D1. Moreover, an accommodation space in the box body 10 is defined by the first push element 11, the second push element 12, the third push element 13 and the fourth push element 14 collaboratively. The capacity of the accommodation space is determined according to the relationships between the first push element 11, the second push element 12, the third push element 13 and the fourth push element 14. Consequently, the battery with a suitable size or a suitable number of batteries can be accommodated within the box body 10.

The structure of the battery box 1 will be described in more details as follows.

Please refer to FIGS. 1, 2, 3 and 4 again. The battery box 1 further comprises a casing 15, at least one first elastic element 16, at least one second elastic element 17, at least one third elastic element 18 and at least one fourth elastic element 19. The box body 10 is disposed within the casing 15. The casing 15 comprises a first sheltering plate 151 a second sheltering plate 152, a third sheltering plate 153 and a fourth sheltering plate 154. The first sheltering plate 151 of the casing 15 is aligned with the first lateral wall 101 of the box body 10. The second sheltering plate 152 of the casing 15 is aligned with the second lateral wall 102 of the box body 10. The third sheltering plate 153 of the casing 15 is aligned with the bottom wall 103 of the box body 10. The fourth sheltering plate 154 of the casing 15 is aligned with the third lateral wall 104 of the box body 10. The first elastic element 16 is contacted between the first sheltering plate 151 of the casing 15 and the first push element 11. In response to an elastic restoring force of the first elastic element 16, the first push element 11 is moved along the first axis D1 and penetrated through the first opening O1 of the first lateral wall 101 of the box body 10. The second elastic element 17 is contacted between the second sheltering plate 152 of the casing 15 and the second push element 12. In response to an elastic restoring force of the second elastic element 17, the second push element 12 is moved along the second axis D2 and penetrated through the second opening O2 of the second lateral wall 102 of the box body 10. The third elastic element 18 is contacted between the third sheltering plate 153 of the casing 15 and the third push element 13. In response to an elastic restoring force of the third elastic element 18, the third push element 13 is moved along the third axis D3 and penetrated through the third opening O3 of the bottom wall 103 of the box body 10. The fourth elastic element 19 is contacted between the fourth sheltering plate 154 of the casing 15 and the fourth push element 14. In response to an elastic restoring force of the fourth elastic element 19, the fourth push element 14 is moved along the first axis D1 and penetrated through the fourth opening O4 of the third lateral wall 104 of the box body 10.

Preferably but not exclusively, the first elastic element 16, the second elastic element 17, the third elastic element 18 and the fourth elastic element 19 are springs. In this embodiment, the battery box 1 comprises two first elastic elements 16, one second elastic element 17, two third elastic elements 18 and two fourth elastic elements 19. It is noted that the numbers of the at least one first elastic element 16, the at least one second elastic element 17, the at least one third elastic element 18 and the at least one fourth elastic element 19 are not restricted. The numbers of these elastic elements may be varied according to the practical requirements.

Please refer to FIGS. 1, 2, 3 and 4 again. The box body 10 further comprises a fourth lateral wall 105. The fourth lateral wall 105 of the box body 10 is opposed to the second lateral wall 102. The fourth lateral wall 105, the first lateral wall 101, the third lateral wall 104 and the bottom wall 103 are arranged beside each other.

In this embodiment, the battery box 1 further comprises a first conductive plate C1, a second conductive plate C2 and a covering plate 100. The first conductive plate C1 is installed on the second push element 12. The second conductive plate C2 is installed on the fourth lateral wall 105 of the box body 10. In addition, the first conductive plate C1 and the second conductive plate C2 are opposed to each other. The box body 10 is covered by the covering plate 100. In addition, the bottom wall 103 of the box body 10 and the covering plate 100 are opposed to each other. In an embodiment, the first conductive plate C1 is a negative electrode plate that is electrically connected with a negative electrode contact of a circuit board (not shown), and the second conductive plate C2 is a positive electrode plate that is electrically connected with a positive electrode contact of the circuit board. When a battery is placed within the box body 10, the negative electrode and the positive electrode of the battery are electrically connected with the first conductive plate C1 and the second conductive plate C2, respectively. It is noted that numerous modifications and alterations may be made while retaining the teachings of the invention. For example, in another embodiment, the first conductive plate C1 is a positive electrode plate that is electrically connected with the positive electrode contact of the circuit board, and the second conductive plate C2 is a negative electrode plate that is electrically connected with the negative electrode contact of the circuit board Hereinafter, the operations of the battery box 1 in different usage states will be described as follows.

Please refer to FIGS. 1, 2, 3 and 4 again. In case that no battery is placed in the box body 10 of the battery box 1, the first elastic element 16, the second elastic element 17, the third elastic element 18 and the fourth elastic element 19 of the battery box 1 are not compressed. That is, these elastic elements are not subjected to deformation. Meanwhile, there is a first distance L1 between a first contact surface 110 of the first push element 11 and the first lateral wall 101 of the box body 10, between a second contact surface 120 of the second push element 12 and the second lateral wall 102 of the box body 10, between a third contact surface 130 of the third push element 13 and the bottom wall 103 of the box body 10, or between a fourth contact surface 140 of the fourth push element 14 and the third lateral wall 104 of the box body 10. Under this circumstance, the accommodation space with a first capacity A1 is defined by the first contact surface 110, the second contact surface 120, the third contact surface 130 and the fourth contact surface 140 collaboratively.

Figure 5:
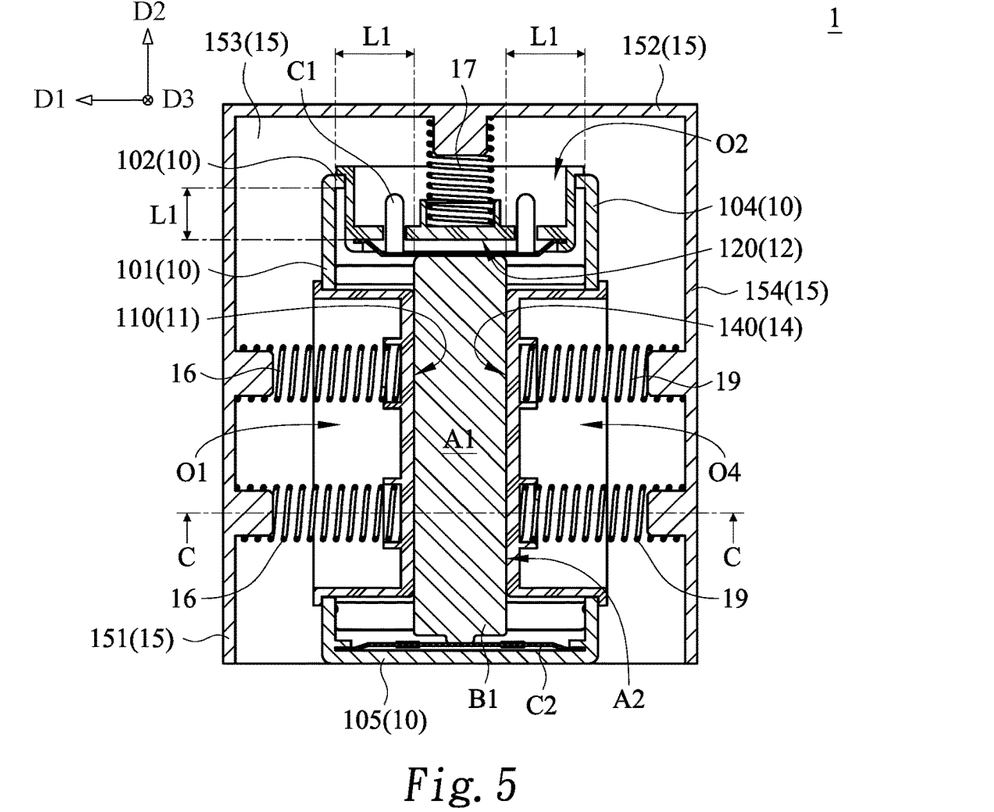
FIG. 5 is a schematic top view illustrating the battery box according to the embodiment of the present invention, in which the battery box is in a first usage state.
Figure 6:
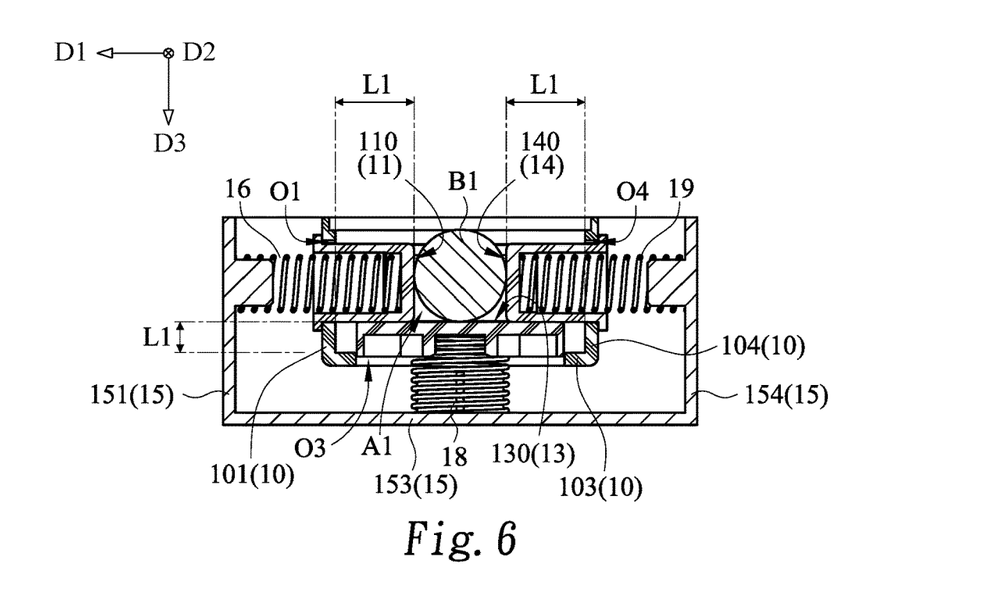
FIG. 6 is a schematic cross-sectional view illustrating the battery box of FIG. 5 and taken along the line CC.

Please refer to FIGS. 5 and 6. FIG. 5 is a schematic top view illustrating the battery box according to the embodiment of the present invention, in which the battery box is in a first usage state. FIG. 6 is a schematic cross-sectional view illustrating the battery box of FIG. 5 and taken along the line CC. In the first usage state of the battery box 1, a single first-size battery B1 is disposed within the box body 10. For example, the first-size battery B1 is an AAA battery (i.e., No. 7 battery). After the first-size battery B1 is disposed within the box body 10, different sides of the first-size battery B1 are in close contact with the first contact surface 110 of the first push element 11, the second contact surface 120 of the second push element 12, the third contact surface 130 of the third push element 13 and the fourth contact surface 140 of the fourth push element 14, respectively. Consequently, the first-size battery B1 can be securely fixed in the box body 10. In an embodiment, when no battery is placed in the battery box 1, the first capacity A1 of the accommodation space of the first capacity A1 defined by the first push element 11, the second push element 12, the third push element 13 and the fourth push element 14 is substantially equal to the volume of the first-size battery B1. Consequently, after first-size battery B1 is disposed within the box body 10, the first push element 11, the second push element 12, the third push element 13 and the fourth push element 14 are almost not moved. Since different sides of the first-size battery B1 are pushed by the first push element 11, the second push element 12, the third push element 13 and the fourth push element 14 in response to the small magnitudes of the first elastic element 16, the second elastic element 17, the third elastic element 18 and the fourth elastic element 19, the first-size battery B1 can be securely fixed in the box body 10. Moreover, the first conductive plate C1 is arranged between the second contact surface 120 of the second push element 12 and the first-size battery B1. Consequently, the contact between the second contact surface 120 of the second push element 12 and the first-size battery B1 means that the first-size battery B1 is in contact with the first conductive plate C1.

Figure 7:
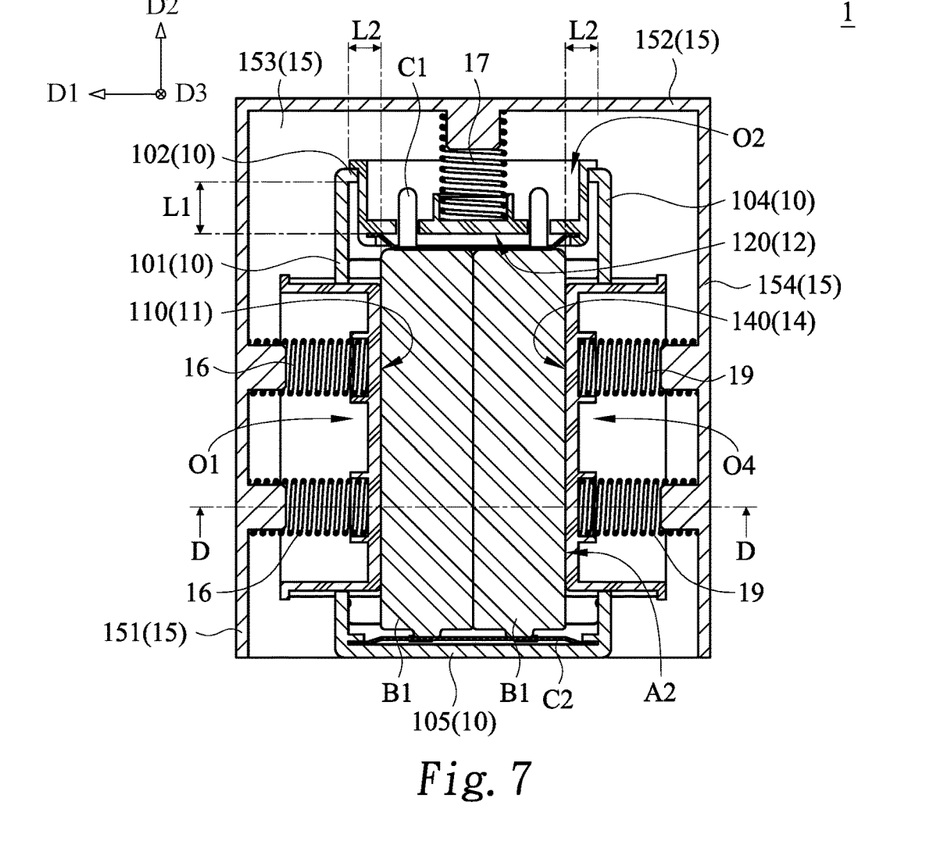
FIG. 7 is a schematic top view illustrating the battery box according to the embodiment of the present invention, in which the battery box is in a second usage state.
Figure 8:
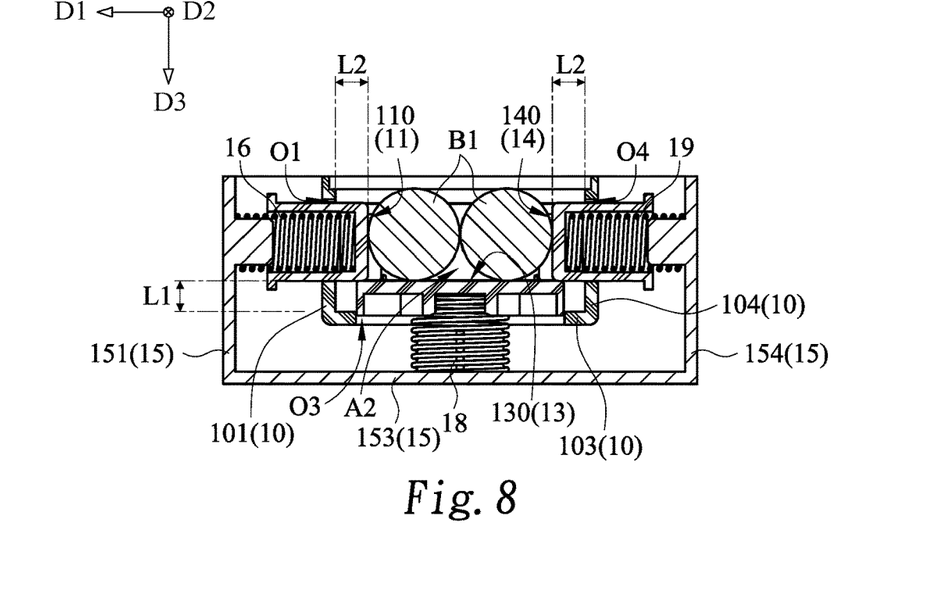
FIG. 8 is a schematic cross-sectional view illustrating the battery box of FIG. 7 and taken along the line DD.

Please refer to FIGS. 7 and 8. FIG. 7 is a schematic top view illustrating the battery box according to the embodiment of the present invention, in which the battery box is in a second usage state. FIG. 8 is a schematic cross-sectional view illustrating the battery box of FIG. 7 and taken along the line DD. In the second usage state of the battery box 1, plural first-size batteries B1 are disposed within the box body 10. For example, the first-size batteries B1 are two AAA batteries (i.e., No. 7 batteries). After the two first-size batteries B1 are disposed within the box body 10, different sides of the two first-size batteries B1 are in close contact with the first contact surface 110 of the first push element 11, the second contact surface 120 of the second push element 12, the third contact surface 130 of the third push element 13 and the fourth contact surface 140 of the fourth push element 14, respectively. In comparison with the single first-size battery B1, the overall width of the two first-size batteries B1 is increased. That is, only the first elastic element 16 and the fourth elastic element 19 are compressed by the two first-size batteries B1. Consequently, the first push element 11 is moved toward the first lateral wall 101 along the first axis D1, and the fourth push element 14 is moved toward the third lateral wall 104 along the first axis D1. Under this circumstance, the distance between the first contact surface 110 of the first push element 11 and the first lateral wall 101 is reduced from the first distance L1 to a second distance L2, and the distance between the fourth contact surface 140 of the fourth push element 14 and the third lateral wall 104 is reduced from the first distance L1 to the second distance L2. Meanwhile, the accommodation space with a second capacity A2 is defined. The second capacity A2 is larger than the first capacity A1.

Figure 9:
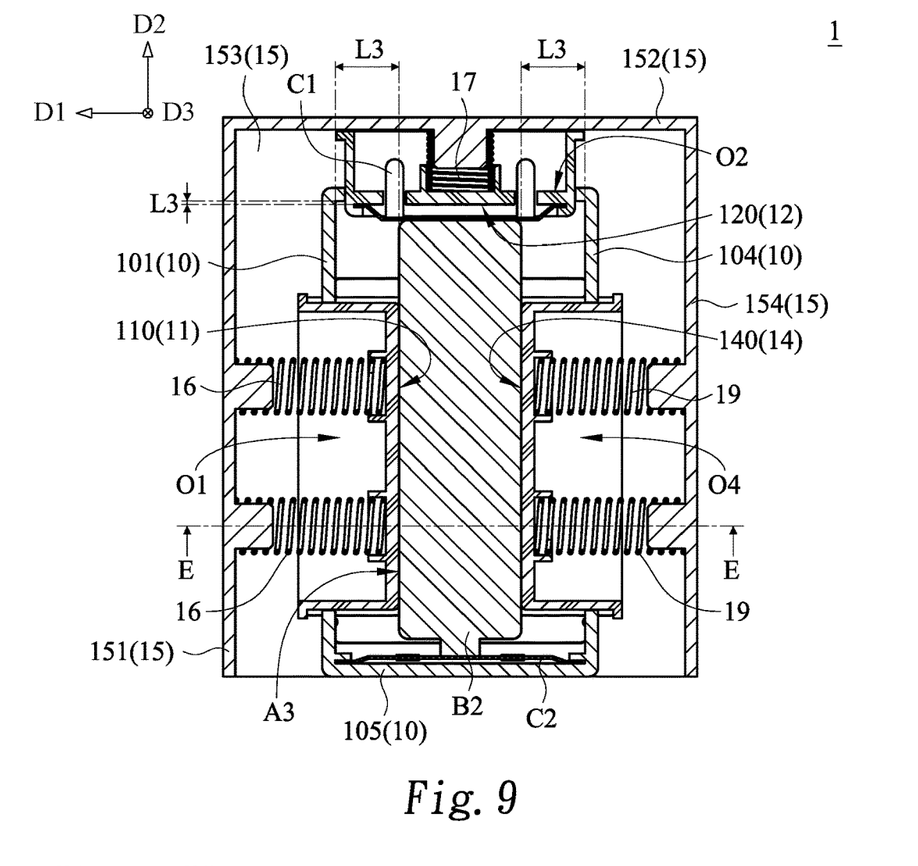
FIG. 9 is a schematic top view illustrating the battery box according to the embodiment of the present invention, in which the battery box is in a third usage state.
Figure 10:
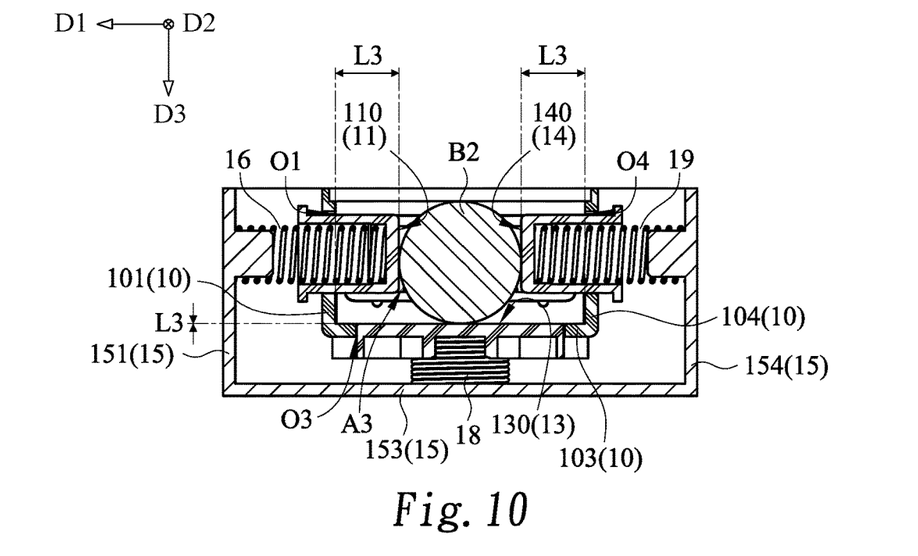
FIG. 10 is a schematic cross-sectional view illustrating the battery box of FIG. 9 and taken along the line EE.

Please refer to FIGS. 9 and 10. FIG. 9 is a schematic top view illustrating the battery box according to the embodiment of the present invention, in which the battery box is in a third usage state. FIG. 10 is a schematic cross-sectional view illustrating the battery box of FIG. 9 and taken along the line EE. In the third usage state of the battery box 1, a single second-size battery B2 is disposed within the box body 10. For example, the second-size battery B2 is an AA battery (i.e., No. 5 battery). After the second-size battery B2 is disposed within the box body 10, different sides of the second-size battery B2 are in close contact with the first contact surface 110 of the first push element 11, the second contact surface 120 of the second push element 12, the third contact surface 130 of the third push element 13 and the fourth contact surface 140 of the fourth push element 14, respectively. In comparison with the first-size battery B1, the length, width and height of the second-size battery B2 are increased. That is, the volume of the second-size battery B2 is increased. That is, the first elastic element 16, the second elastic element 17, the third elastic element 18 and the fourth elastic element 19 are compressed by the second-size battery B2. Consequently, the first push element 11 is moved toward the first lateral wall 101 along the first axis D1, the second push element 12 is moved toward the second lateral wall 102 along the second axis D2, the third push element 13 is moved toward the bottom wall along the third axis D3, and the fourth push element 14 is moved toward the third lateral wall 104 along the first axis D1. Under this circumstance, the distance between the first contact surface 110 of the first push element 11 and the first lateral wall 101 is reduced from the first distance L1 to a third distance L3, the distance between the second contact surface 120 of the second push element 12 and the second lateral wall 102 is reduced from the first distance L1 to the third distance L3, the distance between the third contact surface 130 of the third push element 13 and the bottom wall 103 is reduced from the first distance L1 to the third distance L3 (nearly 0), and the distance between the fourth contact surface 140 of the fourth push element 14 and the third lateral wall 104 is reduced from the first distance L1 to the third distance L3. Meanwhile, the accommodation space with a third capacity A3 is defined. The third capacity A3 is larger than the first capacity A1.

Figure 11:
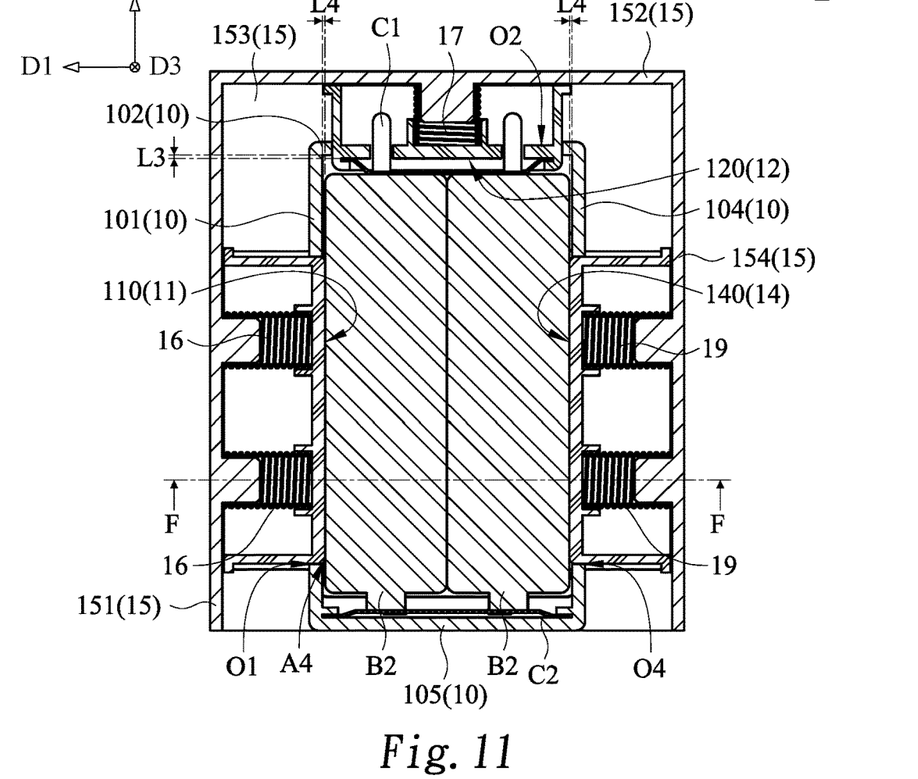
FIG. 11 is a schematic top view illustrating the battery box according to the embodiment of the present invention, in which the battery box is in a fourth usage state.
Figure 12:
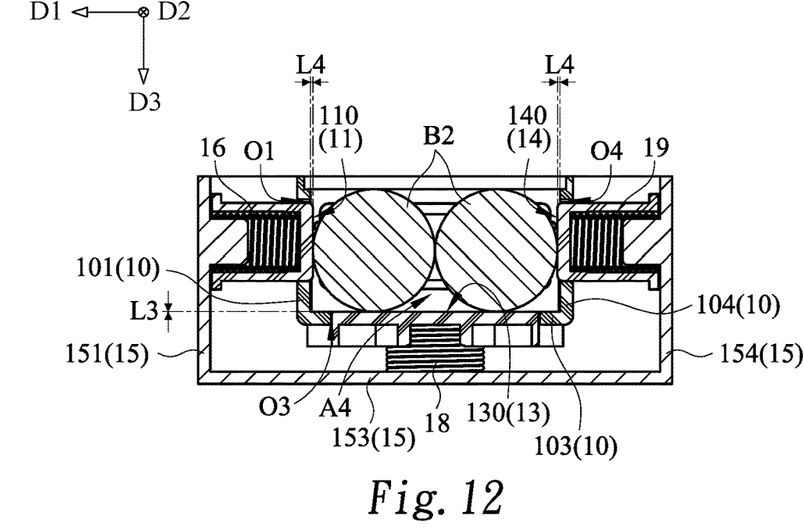
FIG. 12 is a schematic cross-sectional view illustrating the battery box of FIG. 11 and taken along the line FF.

Please refer to FIGS. 11 and 12. FIG. 11 is a schematic top view illustrating the battery box according to the embodiment of the present invention, in which the battery box is in a fourth usage state. FIG. 12 is a schematic cross-sectional view illustrating the battery box of FIG. 11 and taken along the line FF. In the fourth usage state of the battery box 1, at least two second-size battery B2 are disposed within the box body 10. For example, the second-size batteries B2 are two AA batteries (i.e., No. 5 batteries). After the two second-size batteries B2 are disposed within the box body 10, different sides of the two second-size batteries B2 are in close contact with the first contact surface 110 of the first push element 11, the second contact surface 120 of the second push element 12, the third contact surface 130 of the third push element 13 and the fourth contact surface 140 of the fourth push element 14, respectively. In comparison with the single second-size battery B2 (i.e., the third usage state as shown in FIGS. 9 and 10), the overall width of the two second-size batteries B2 is increased. is, only the first elastic element 16 and the fourth elastic element 19 are compressed by the two second-size batteries B2. Consequently, the first push element 11 is moved toward the first lateral wall 101 along the first axis D1, and the fourth push element 14 is moved toward the third lateral wall 104 along the first axis D1. Under this circumstance, the distance between the first contact surface 110 of the first push element 11 and the first lateral wall 101 is reduced from the third distance L3 to a fourth distance L4, and the distance between the fourth contact surface 140 of the fourth push element 14 and the third lateral wall 104 is reduced from the third distance L3 to the fourth distance L4. Meanwhile, the accommodation space with a fourth capacity A4 is defined. The fourth capacity A4 is larger than the third capacity A3.

As mentioned above, the battery box 1 as shown in FIGS. 5 and 6 is in the first usage state, the battery box 1 as shown in FIGS. 7 and 8 is in the second usage state, and the battery box 1 as shown in FIGS. 9 and 10 is in the third usage state, and the battery box 1 as shown in FIGS. 11 and 12 is in the fourth usage state. The relationships between the capacities of the accommodation space in different usage states may be expressed as: fourth capacity A4>second capacity A2>third capacity A3>first capacity A1.

In the second usage stat as shown in FIGS. 7 and 8, two AAA batteries (i.e., No. 7 batteries) within the box body 10 are connected with each other in parallel. In the fourth usage stat as shown in FIGS. 11 and 12, two AA batteries (i.e., No. 5 batteries) within the box body 10 are connected with each other in parallel. Consequently, the total use time of the batteries will be increased.

From the above descriptions, the present invention provides the battery box. The push elements of the battery box are movable along three axes in response to the elastic restoring forces of the elastic elements. Consequently, the capacity of the accommodation space in the box body is adjustable according to the usage state of the battery box. In such way, the battery with a suitable size or a suitable number of batteries can be accommodated within the box body. Due to this design, different types of batteries can be placed within the battery box of the present invention. The batteries can be easily placed within the battery box through the two steps of pressing the batteries into the box body of the battery box and covering the covering plate. Similarly, the batteries can be easily removed from the battery box through the two steps of opening the covering plate and taking out the batteries from the box body. The battery box of the present invention has a simplified structure and succinct components. Consequently, the battery box is user-friendly and cost-effective.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A battery box, comprising:
   a box body comprising a first lateral wall, a second lateral wall, a third lateral wall, a fourth lateral wall, and a bottom wall, wherein the first lateral wall has a first opening, the second lateral wall has a second opening, the bottom wall has a third opening, and the third lateral wall has a fourth opening, wherein the first opening, the second opening and the third opening face different directions and the fourth opening, the second opening and the third opening face different directions, wherein the third lateral wall is opposed to the first lateral wall and the fourth lateral wall is opposed to the second lateral wall, wherein the first lateral wall, the second lateral wall, and the bottom wall are arranged beside each other, wherein the third lateral wall, the second lateral wall, and the bottom wall are arranged beside each other, and the third lateral wall, the fourth lateral wall, and the bottom wall are arranged beside each other;
   a casing comprising a first sheltering plate, a second sheltering plate, a third sheltering plate and a fourth sheltering plate, wherein the box body is disposed within the casing, the first sheltering plate is aligned with the first lateral wall, the second sheltering plate is aligned with the second lateral wall, the third sheltering plate is aligned with the bottom wall, the fourth sheltering plate is aligned with the third lateral wall;
   a first push element movably penetrated through the first opening of the first lateral wall, wherein the first push element is moved along a first axis in response to a first external force;
   a second push element movably penetrated through the second opening of the second lateral wall, wherein the second push element is moved along a second axis in response to a second external force;
   a third push element movably penetrated through the third opening of the bottom wall, wherein the third push element is moved along a third axis in response to a third external force,
   wherein the first axis, the second axis and the third axis are not in parallel with each other, and an accommodation space of the box body is defined by the first push element, the second push element and the third push element according to a usage state of the battery box;
   at least one first elastic element contacted between the first sheltering plate and the first push element, wherein the first push element is moved along the first axis and penetrated through the first opening of the first lateral wall in response to an elastic restoring force of the first elastic element;
   at least one second elastic element contacted between the second sheltering plate and the second push element, wherein the second push element is moved along the second axis and penetrated through the second opening of the second lateral wall in response to an elastic restoring force of second first elastic element;
   at least one third elastic element contacted between the third sheltering plate and the third push element, wherein the third push element is moved along the third axis and penetrated through the third opening of the bottom wall in response to an elastic restoring force of third first elastic element; and at least one fourth elastic element contacted between the fourth sheltering plate and the fourth push element, wherein the fourth push element is moved along the first axis and penetrated through the fourth opening of the third lateral wall in response to an elastic restoring force of the fourth elastic element.

2. The battery box according to claim 1, wherein the battery box further comprises a fourth push element, which is movably penetrated through the fourth opening of the third lateral wall and moved along the first axis in response to a fourth external force, wherein the capacity of the accommodation space of the box body is defined by the first push element, the second push element, the third push element and the fourth push element according to the usage state of the battery box.

3. The battery box according to claim 2, wherein the first push element has a first contact surface, the second push element has a second contact surface, the third push element has a third contact surface, and the fourth push element has a fourth contact surface, wherein the accommodation space of the box body is defined by the first contact surface, the second contact surface, the third contact surface and the fourth contact surface collaboratively, and the accommodation space has a first capacity.

4. The battery box according to claim 3, wherein when the usage state of the battery box is a first usage state, a single first-size battery is disposed within the box body, and the first-size battery is contacted with the first contact surface of the first push element, the second contact surface of the second push element, the third contact surface of the third push element and the fourth contact surface of the fourth push element, so that the first-size battery is fixed in the accommodation space with the first capacity.

5. The battery box according to claim 4, wherein when the usage state of the battery box is a second usage state, plural first-size batteries are disposed within the battery box, and the first-size batteries are contacted with the first contact surface of the first push element, the second contact surface of the second push element, the third contact surface of the third push element and the fourth contact surface of the fourth push element, wherein while the usage state of the battery box is changed from the first usage state to the second state, the first push element is moved toward the first lateral wall along the first axis, and the fourth push element is moved toward the third lateral wall along the first axis, so that a distance between the first contact surface and the first push element and a distance between the fourth contact surface and the third lateral wall are reduced and the accommodation space has a second capacity, wherein the second capacity is larger than the first capacity.

6. The battery box according to claim 3, wherein when the usage state of the battery box is a third usage state, a single second-size battery is disposed within the box body, and the second-size battery is contacted with the first contact surface of the first push element, the second contact surface of the second push element, the third contact surface of the third push element and the fourth contact surface of the fourth push element, wherein while the second-size battery is placed within the box body, the first push element is moved toward the first lateral wall along the first axis, the second push element is moved toward the second lateral wall along the second axis, the third push element is moved toward the bottom wall along the third axis, and the fourth push element is moved toward the third lateral wall along the first axis, so that a distance between the first contact surface and the first lateral wall, a distance between the second contact surface and the second lateral wall, a distance between the third contact surface and the bottom wall and a distance between the fourth contact surface and the third lateral wall are reduced and the accommodation space has a third capacity, wherein the third capacity is larger than the first capacity.

7. The battery box according to claim 6, wherein when the usage state of the battery box is a fourth usage state, plural second-size batteries are disposed within the battery box, and the first-size batteries are contacted with the first contact surface of the first push element, the second contact surface of the second push element, the third contact surface of the third push element and the fourth contact surface of the fourth push element, wherein while the usage state of the battery box is changed from the third usage state to the fourth state, the first push element is moved toward the first lateral wall along the first axis, and the fourth push element is moved toward the third lateral wall along the first axis, so that a distance between the first contact surface and the first push element and a distance between the fourth contact surface and the third lateral wall are reduced and the accommodation space has a fourth capacity, wherein the fourth capacity is larger than the third capacity.

8. The battery box according to claim 2, wherein the battery box further comprises a first conductive plate and a second conductive plate, wherein the first conductive plate is installed on the second push element, the second conductive plate is installed on the fourth lateral wall, and the first conductive plate and the second conductive plate are opposed to each other.

9. The battery box according to claim 1, wherein the battery box further comprises a covering plate, wherein the box body is covered by the covering plate, and the covering plate and the bottom wall are opposed to each other.

* * * * *